United States Patent [19]  [11] Patent Number: 4,773,558
Taira et al.  [45] Date of Patent: Sep. 27, 1988

[54] EASILY-OPENABLE CLOSURE FOR SEAMED CAN

[75] Inventors: Kazuo Taira, Tokyo; Naoto Watanabe, Yokohama; Hiroshi Matsubayashi, Kamakura; Hiroshi Ueno, Yokosuka, all of Japan

[73] Assignee: Toyo Seikan Kaisha, Ltd., Tokyo, Japan

[21] Appl. No.: 18,547

[22] Filed: Feb. 25, 1987

[30] Foreign Application Priority Data

Feb. 28, 1986 [JP] Japan ................................ 61-41955
Mar. 13, 1986 [JP] Japan ................................ 61-53763

[51] Int. Cl.⁴ ............................................. B65D 17/34
[52] U.S. Cl. ................................................... 220/270
[58] Field of Search ............................ 220/269–273, 220/359

[56] References Cited

U.S. PATENT DOCUMENTS 3,187,931  6/1965  Henchert ............................ 220/270
4,485,935 12/1984  Stoffel ................................. 220/270

Primary Examiner—George T. Hall
Attorney, Agent, or Firm—Sughrue, Mion, Zinn, Macpeak, and Seas

[57] ABSTRACT

An easily openable closure adapted to be fixed to a can body by seaming. The closure comprises a closure body of a rigid metallic material, a score formed therein reaching halfways in the thickness direction of the metallic closure body for defining a portion to be opened, and an opening tab provided near a score shearing starting point through a bonding support. The bonding support is comprised of a polyamide-type adhesive containing 6.1 to 15.0 main-chain carbon atoms on an average per amide group and having a crystallinity of 15 to 40% and a dynamic modulus, determined at a temperature of 25° C. and a relative humidity of not more than 30%, of $0.8 \times 10^{10}$ to $3.3 \times 10^{10}$ dynes/cm².

8 Claims, 4 Drawing Sheets

EASILY-OPENABLE CLOSURE FOR SEAMED CAN

BACKGROUND OF THE INVENTION

1. Field of the Invention

This invention relates to an easily openable closure for a seamed can, and more specifically, to an easily openable closure to which an opening tab for shearing a score formed in the closure is bonded and remains fixed until the completion of the opening operation even after retorting.

2. Description of the Prior Art

An easily openable closure having an opening portion defined by a score has been widely used in cans for holding drinks and beverages such as coca cola, beer and juices. A rivet is formed in the opening portion and a pulling tab is fixed to it by riveting. Pulling of the tab results in breaking of the score and consequent detachment of the opening portion.

In the formation of such an easily openable closure, the coating on the inside surface of the closure is liable to undergo damage by severe workings such as riveting. Hence, with such a closure, no entirely satisfactory results have been obtained with regard to corrosion resistance in applications where perishable foods such as goods are filled in cans and thereafter the cans are subjected to severe treatments such as heat sterilization (retorting). This tendency is especially pronounced in easily openable closures made of aluminum. Furthermore, with contents of a high salt concentration, pitting corrosion may occur, and leakage of the contents from the pits or bacterial contamination therefrom will result.

Japanese Utility Model Publication No. 524/1976 proposes an easily openable can closure having an opening portion defined by a score and an opening tab bonded thereto.

When the gripping portion of the opening tab is lifted in this type of easily openable closure, its bonded part acts as a fulcrum and the end of the tab is stuffed into the score. As a result, shearing of the score is started. Then, by pulling the tab, the score is entirely sheared. At this time, the force required to push and tear the score acts as a moment on the bonded part whereby the bonded part will easily be broken.

In the field of canning, a filled can to which the easily openable closure is seamed is retorted at high temperatures and pressures, and the bonded part is liable to undergo degradation by attack of high temperatures, hot water or hot steam. This makes the bonded part more liable to be broken. Such a degradation tendency of the bonded part occurs likewise when a repair paint is coated on the score portion in order to repair crackings of the coated film, and then baked.

The manner of opening a can by detaching the easily openable closure differs from individual to individual. For example, when the tab is pulled without lifting it to a position nearly at right angles to the closure, a relatively large moment is exerted on the bonded part between the tab and the closure and the bonded part is liable to break easily. Furthermore, when the tab is pulled incorrectly in the tab direction, a moment also acts on the bonded part, and the bonded part becomes liable to break.

SUMMARY OF THE INVENTION

It is an object of this invention to provide an easily openable closure to which an opening tab for shearing a score formed in the closure remains bonded and fixed accurately until the completion of the opening operation without being peeled by the moment exerted at the time of the opening operation irrespective of retorting or other heat histories.

Another object of this invention is to provide an easily openable closure of a metal bonded structure using a polyamide composition having a high melting point and a reduced tendency to crystallization by heat.

According to the present invention, there is provided an easily openable closure adapted to be fixed to a can body by seaming and comprising a closure body of a rigid metallic material, a score formed therein reaching halfways in the thickness direction of the metallic closure body for defining a portion to be opened, and an opening tab provided near a score shearing starting point through a bonding support, said bonding support being comprised of a polyamide-type adhesive containing 6.1 to 15.0 main-chain carbon atoms on an average per amide group and having a crystallinity of 15 to 40% and a dynamic modulus, determined at a temperature of 25° C. and a relatively humidity of not more than 20%, of $0.8 \times 10^{10}$ to $3.5 \times 10^{10}$ dynes/cm².

In a preferred embodiment, the polyamide-type adhesive used in the easily openable closure is composed of a polyamide composition comprising 55 to 97% by weight of hexamethylene sebacamide units, 1 to 35% by weight of 6-aminocaproic acid units and 0 to 35% by weight of other amide recurring units in the polymer chain as a whole, and having a melting point, determined by a differential scanning calorimeter as a peak value, of 210° to 227° C., and a crystal fusion heat variation R, defined by the following equation $$R = (S_1 - S_0)/S_0 \times 100 \quad (1)$$

wherein $S_o$ is the amount of heat of absorption by fusion determined on a melted and quenched product of the polyamide composition by a differential scanning calorimeter and $S_1$ is the amount of heat of absorption by fusion determined on the polyamide composition adhesive layer by a differential scanning calorimeter, of 0 to 15%.

The polyamide composition may be any polyamide composition satisfying the above requirements. A preferred polyamide composition is composed of (A) polyhexamethylene sebacamide having a relative viscosity ($n_{rel}$), measured in a 1% solution of the polymer in 98 % sulfuric acid, of 2.3 to 3.5, and (B) at least one copolyamide containing at least 25% by weight of 6-aminocaproic acid units and having a relative viscosity of 2.3 to 3.5 in an A:B weight ratio of from 89:11 to 55:45.

Bonding of the metallic material may be carried out directly through the polyamide composition. But in order to prevent corrosion of the metallic material and increase the adhesion strength, it is desirable to form an epoxy-type adhesive primer layer on that surface of the metallic material which is to be bonded, and to bond the metallic material and the polyamide-type adhesive through the adhesive primer layer.

Figure 1:
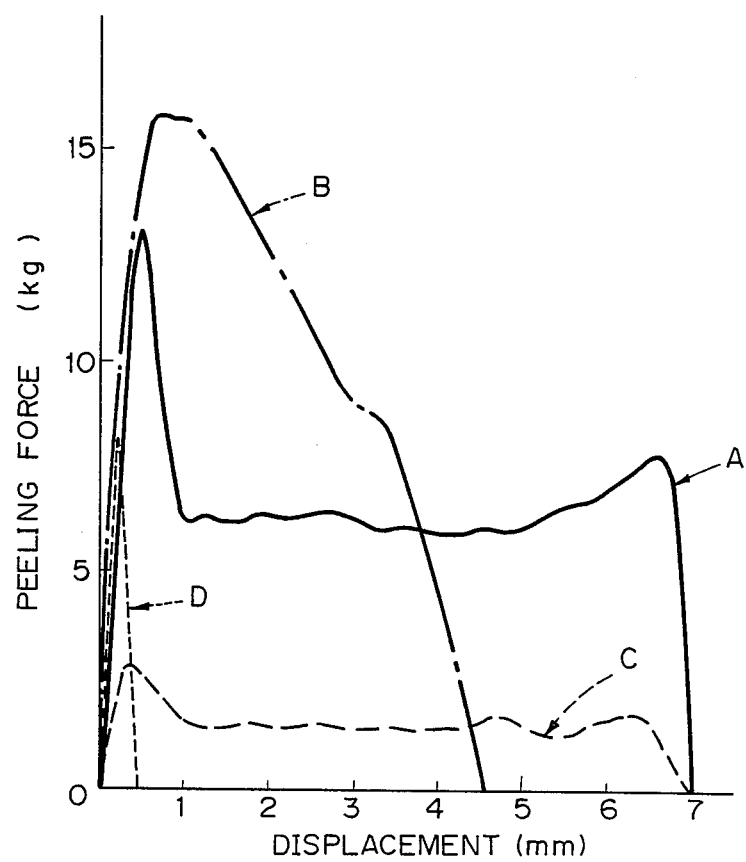
FIG. 1 is a graph showing the relation between the pulling force in a 90° direction and the amount of displacement which are measured on various polyamide adhesives.

The reference numeral 1 represents an easily openable closure; 2, a primer coating; 3, a metallic material; 6, a panel portion; 8, a score; 9, a portion to be opened; 10, an opening tab; 11, a score tearing end; 12, a gripping portion; 13, a support point; and 16, a polyamide-type adhesive layer.

DETAILED DESCRIPTION OF THE INVENTION

An adhesive for bonding and fixing an opening tab to a closure body is required to have properties quite different from an adhesive used to form a side seam in a usual can body. A shearing force is exclusively exerted on the adhesive for the side seam, and therefore, a good adhesive for side seams is one which withstands high shearing forces. In contrast, since a moment acts on the adhesion support point in the adhesive for fixing the tab to the closure, it is important that this adhesive should withstand such an opening moment.

FIRST EMBODIMENT

The present invention is based on the finding that specific polyamide-type adhesives having average main-chain carbon atoms numbers per amide group, crystallinities and dynamic moduli within the aforesaid ranges can be an excellent bonding support between the closure body and the opening tab on which a destructive force by a moment is exerted.

Generally, the average number of main-chain carbon atoms per amide group in a polyamide has to do with the strength of hydrogen bonding between molecules, and also exerts serious effects on the magnitude of the cohesive force, the hardness or affinity for water. If the average number of main-chain carbon atoms per amide group is less than 6.1, the melting point of the polyamide becomes too high and the bondable temperature also becomes too high. As a result, the bonding operation tends to become difficult. Inconveniences such as charring of the adhesive primer or the protective coating may occur, and it is also difficult to control cooling after the bonding and thus the crystallinity of the polyamide composition. Moreover, the polyamide becomes very sensitive to water and varies greatly in dynamic properties depending upon the variations in water content. Furthermore, defects such as foaming are liable to occur in the bonded part owing to water contained. If the average number of main-chain carbon atoms per amide group exceeds 15.0, the cohesive force of the polyamide itself tends to become lower, and the heat resistance of the polyamide is reduced. Hence, the adhesion strength will be reduced at the time of baking a repair paint on the score or during retorting. In an extreme case, the bonding support may be dislocated, and the adhesion of the polyamide-type adhesive to the primer is reduced.

In the present invention, polyamides having the aforesaid molecular chain structure are selected. This alone is insufficient for providing a bonding support between the closure body and the opening tab, and it is important that the polyamides should have a crystallinity in the range of 15 to 40%. The crystallinity is that of the polyamide forming the bonding support which is determined by an X-ray diffraction method. The density method and the fusion heat method are known for the measurement of crystallinity in addition to the X-ray diffraction method. Since the measured values obtained by these methods correspond to the measured values obtained by the X-ray diffraction method. The measured values obtained by the other methods may be corrected according to the correspondence and used as the crystallinity as referred to in this invention. If the crystallinity is higher than 40%, the polyamide composition has too high a modulus and tends to have weak dynamic properties, and consequently becomes unsuitable as the bonding support. Furthermore, the polyamide bonding support having such a high crystallinity shrinks greatly during the solidification step after melt-bonding, and a residual stress occurs in its inside or in the interface. Accordingly, the adhesion strength tends to be reduced greatly with time. On the other hand, if the polyamide bonding support has a crystallinity of less than 15%, its heat resistance and hot water resistance are markedly low, and its modulus is also low. Accordingly, the initial opening force cannot be fully increased.

It is also important that in the present invention, polyamides having a dynamic modulus, determined at a temperature of 25° C. and a relative humidity of not more than 20%, of $0.8 \times 10^{10}$ to $3.5 \times 10^{10}$ dynes/cm$^2$ should be selected. The dynamic modulus, as used herein, is a modulus measured when a periodical strain of a fixed frequency is given to the polyamide, and more specifically the modulus measured by the method shown in working examples to be given hereinbelow. the opening property of the easily openable closure having an adhesion support point can be evaluated by the relation between the peeling force (kg) in a 90° direction at a pulling speed of 200 mm/sec and the amount of displacement (mm).

FIG. 1 is obtained by plotting the above peeling force (kg) and the amount of displacement (mm) on a polyamides having dynamic modulus within the range specified by this invention ($1.5 \times 10^{10}$ dynes/cm$^2$... curve A; and $2.7 \times 10^{10}$ dynes/cm$^2$... curve B), a polyamide having a lower dynamic modulus than that specified in the invention ($0.68 \times 10^{10}$ dynes/cm$^2$... curve C) and a polyamide having a higher dynamic modulus than that specified in the invention ($4.8 \times 10^{10}$ dynes/cm$^2$... curve D). In FIG. 1, the higher the peeling force reached at the rising point, the higher the initial opening force. Furthermore, the larger the integral of the curve, namely the amount of the 90 degree peeling work, the tougher the bonding support.

If the dynamic modulus is lower than the above-specified range, it is impossible to obtain an initial opening force sufficient to start shearing of the score, or the moment exerted at this time on the support becomes predominant so that the bonding support is liable to be dislocated. If the dynamic modulus is larger than the specified limit, a high initial opening force can be obtained, but the bonding support cannot follow the displacement. Consequently, the stress is concentrated on one point to destroy the bonding support.

According to this invention, by using a polyamide-type adhesive meeting all of the requirements described above as a bonding support, it is possible to bring the peeling force reached at the rising point to at least 8.0 kg which is required for initial opening, and the amount of the 90 degree peeling work per cm² of the bonded area to not more than 2.5 kg-cm which is required for complete opening.

SECOND EMBODIMENT

In a preferred embodiment, the present invention is based on the finding that when a polyamide composition which simultaneously meets the chemical composition, melting point and crystal fusion heat variation (R) described above is used as an adhesive between metal materials, the resulting bonded structure has markedly improved heat resistance, and even when the bonded structure is heat-treated at a high temperature of, for example 190° to 210° C., the dimensional accuracy of the bonded structure is fully retained, and after the heat treatment, the bonded structure retains high adhesion strength and processability and a metallic container having such a bonded structure has markedly improved heat resistance.

The heat resistance of the polyamide-type adhesive depends roughly upon two factors. One is the thermal properties, for example the softening or melting properties, of the polyamide-type adhesive, and the other as its crystallographic properties. When the polyamide used has a low softening or melting point, the adhesive layer undergoes re-melting at the aforesaid heating temperature. Consequently, the bonded structure is dislocated and its dimensional accuracy is lost. Further problems such as dislocation of the bonded portion, its detachment, or leakage may arise. The polyamide has such a property that its crystallization is promoted by heating. In the heat-bonding step, the problem of crystallization does not arise because the time for melting and cooling is very short. However, at the time of baking a score repairing paint on the closure at high temperatures or during high-temperature retorting of bonded cans, crystallization of the polyamide proceeds markedly. As a result, the mechanical properties of the polyamide are reduced, and it has a markedly reduced adhesion strength or loses processability. Consequently, destruction of the bonded structure or leakage may occur at the time of double seaming.

Increasing of the melting point of the polyamide composition and inhibition of its tendency to crystallization by heating are contradictory requirements. A polyamide having a high melting point has a great tendency to crystallization by heating, and on the other hand, if the tendency to crystallization by heating is inhibited, the melting point itself of the polyamide tends to be lowered.

In the preferred embodiment of the invention, the polyamide composition is a term meaning a polyamide composition having the recurring units described above, and includes, a blend of at least two polyamides and copolyamides, an interpolyamide or block copolyamide obtained by amide exchange reaction of the above blends, and mixtures of these.

The polyamide composition preferably used in this invention contains 55 to 97% by weight, especially 65 to 94% by weight, of hexamethylene sebacamide units based on the entire amide recurring units. Polyamides having hexamethylene sebacamide units as a main curing units have a relatively low water absorption, are not sensitive to moisture, change relatively little in physical properties after moisture absorption, and have suitable suppleness upon moisture absorption as compared with various other polyamides. Furthermore, they have relatively high melting temperatures at which heat-bonding is carried out without charring of the coated films. From this viewpoint, the polyamide composition preferably used in this invention should first contain the aforesaid proportion of hexamethylene sebacamide units. If the content of the hexamethylene sebacamide units exceeds the above-specified limit, the polyamide composition shows the same properties as a hexamethylene sebacamide homopolymer, and particularly has an increased tendency to crystallization by heating at high temperatures. As a result, the impact strength of the bonded portion is reduced, and the cohesive destruction of the adhesive tends to occur easily and the adhesion strength is reduced. On the other hand, if the content of the hexamethylene sebacamide units is lower than the specified limit, the aforesaid excellent properties of polyhexamethylene sebacamide will be lost, and in particular, the heat resistance of the bonded structure is reduced as a result of a decrease in melting point.

As a second requirement, the polyamide composition should contain 1 to 35% by weight, particularly 3 to 25% by weight, of 6-aminocaproic acid units. A polyamide composed of 6-aminocaprotic acid units has heat resistance. At the same time, the 6-aminocaproic acid units and the hexamethylene-sebacamide units affect each other to inhibit crystallization of the polyamide composition at high temperatures and also to prevent the composition from having a higher elastic modulus. If the content of the 6-aminocaproic acid units exceeds the specified limit, the resulting adhesive has too high a modulus and is reduced in impact strength and processability. Furthermore, since this component itself has a very fast rate of crystallization, a stress is liable to occur on the bonding interface or between the primer and the metallic material at the time of bonding, and may become a cause of destruction of the bonded structure. On the other hand, if the content is lower than the specified limit, it is difficult to inhibit crystallization of the hexamethylene sebacamide units at high temperatures and to prevent the adhesive layer from having a higher modulus.

The polyamide composition of this invention may contain up to 35% by weight, especially 3 to 25% by weight, of amide recurring units other than the hexamethylene sebacamide units and the 6-aminocaproic acid units. These additional units serve to decrease the modulus of the adhesive and improve its impact strength and processability. They also serve to aid in inhibiting crystallization at high temperatures. If the content of the other amide recurring units exceeds the above-specified limit, the polyamide composition tends to be reduced greatly in melting point and thus in heat resistance. Furthermore, the polyamide composition becomes sensitive to water and has reduced operability in bonding owing to foaming, etc. The polyamide composition is further reduced in properties in the water-containing state, and therefore has reduced dimensional stability and adhesiveness. The polyamide composition used in this invention should essentially has the aforesaid chemical composition. This chemical composition alone, however, is insufficient in regard to heat resistance, and it is important that the polyamide composition should have a melting point of 210° to 227° C. and a crystal fusion heat variation (R) of 0 to 15%. In other words, incorporation of the recurring units in the above proportions, the above melting points and the above crystal fusion heat variation (R) in the copolyamide composition is important with regard to the heat resistance of the bonded structure or the metallic container.

The melting point of the polyamide composition should be determined by considering the balance between the operability in bonding and the heat resistance temperature required by the bonded structure. If the melting point of the polyamide composition is higher, the dimensional accuracy or dimensional stability of the bonded structure will be retained up to high temperatures. However, since the bonding itself must be carried out at high temperatures, an adhesive primer layer, a protective coating layer or a printed ink layer applied to the metalic material tends to change in color owing to charring or burning. Furthermore, the thermal shock by temperature differences in high temperature heating-cooling increases. Consequently, distortions tends to occur in the bonded structure to cause a reduction in adhesion strength after bonding or with the lapse of time. The temperature of a heat-treatment, such as retorting and coated film baking, of the bonded structure or the metallic container is 200° C. at the highest. Accordingly, if the melting point of the polyamide composition is within the aforesaid range, the polyamide composition has satisfactory performance both in regard to operability in bonding and heat resistance in this invention.

The polyamide composition used in this invention is characterized by having a relatively high temperature as specified above and yet a crystal fusion heat variation (R) within a relatively narrow range of not more than 15%, especially not more than 10%.

The crystal fusion heat variation (R) is a physical property value having the following meaning. In a differential thermal analysis by a differential scanning calorimeter, the amount of heat of absorption by crystal fusion is measured as the integral value of the endothermic peak in crystal fusion. The amount of heat of absorption generally becomes large as the crystallinity of the polyamide becomes higher. Polyamide has a relatively large degree of hydrogen bonding between polymer chains among various thermoplastic polymers. When it is melted and then quenched, it still has some degree of crystallinity. In addition, the polyamide has such as property that its crystallization proceeds markedly by heat-treatment, or with time in a humid condition. The amount of heat of absorption by crystal fusion, $S_O$, in equation (1) given hereinabove reflects the crystal structure of a melted and quenched product of a certain polyamide composition. On the other hand, the amount of heat of absorption by crystal fusion, $S_1$, reflects the crystal structure of this polyamide after the bonding treatment, or the heat treatment or after passage of time. Equation (1) shows the ratio of variation of $S_0$ with respect to $S_1$.

Figure 2:
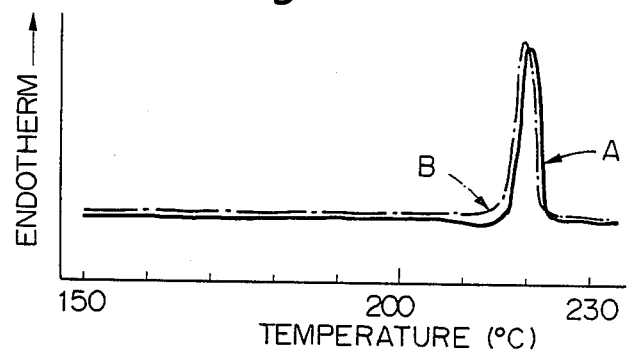
FIGS. 2, 3 and 4 are fusion curves measured on the adhesives shown in Table A by a differential scanning calorimeter.

FIG. 2 of the accompanying drawings shows fusion curves of a polyamide composition in a working example given hereinbelow, i.e. sample No. 124. Curve A is a fusion curve of a melted and quenched product of the polyamide, and curve B is a fusion curve of the polyamide heat-treated at 200° C. for 4 minutes.

Figure 3:
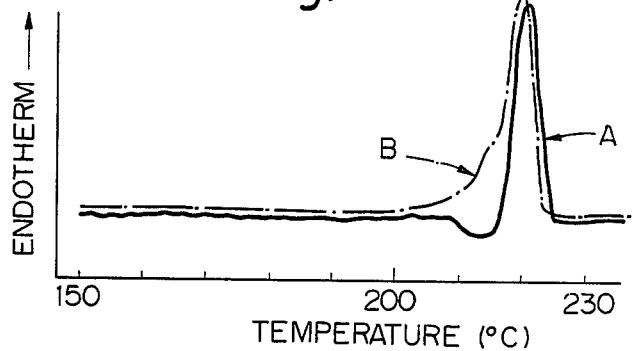

FIG. 3 shows fusion curves of polyhexamethylene sebacamide (nylon 610). Curve A is a fusion curve of a melted and quenched product of the polyamide, and curve B is a fusion curve of the polyamide heat-treated at 200° C. for 4 minutes.

Figure 4:
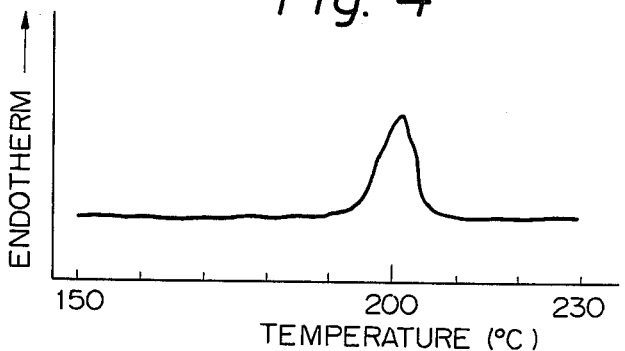

FIG. 4 is a fusion curve of sample No. 129 which is a random copolyamide having the same recurring unit proportions as in the polyamide composition of sample No. 124.

Table A given below summarizes the melting points, crystal fusion heat variations (R), and the modulus before heat-treatment of the three polyamides, and the heat distortion temperatures of T-peel strength bonded portions after the heat-treatment.

These data give the following information. The homopolyamide has a high level of melting point, and its heat-treated product has a considerably high variation (R). It is clearly seen that the modulus of the heat-treated product is extraordinarily high, and its T-peel strength is markedly reduced. The simple copolyamide has a markedly lowered melting point and the heat distortion temperature of the bonded portion is very low. In contrast, if the melting point and crystal fusion heat variation (R) of the polyamide composition are confined within the ranges specified in this invention, the increase of the modulus after heat-treatment can be maintained at a low level, no decrease occurs in T-peel strength, and the heat-distortion temperature of the bonded portion can be maintained at a high level. It is clear therefore that after all, the heat resistance of the bonded structure or a metallic container having the bonded structure can be greatly improved.

TABLE A

| Adhesive | Melting point (°C.) | Crystal fusion heat variation R (%) | Modulus ($\times 10^{10}$ dynes/cm$^2$) | | T peel strength | | Heat distortion temperature (°C.) |
| --- | --- | --- | --- | --- | --- | --- | --- |
| | | | Before heat-treatment | After heat-treatment | Before heat-treatment | After heat-treatment | |
| FIG. 2 (sample No. 124) | 221 | 7 | 1.8 | 1.6 | 6.4 | 5.6 | 218 |
| FIG. 3 (nylon 610) | 223 | 17 | 2.0 | 3.2 | 4.2 | 1.2 | 218 |
| FIG. 4 (sample No. 129) | 202 | 4 | 1.2 | 1.3 | 3.5 | 0.6 (foamed) | 194 |

DESCRIPTION OF PREFERRED EMBODIMENTS OF THE INVENTION

Structure of the Closure

Figure 5:
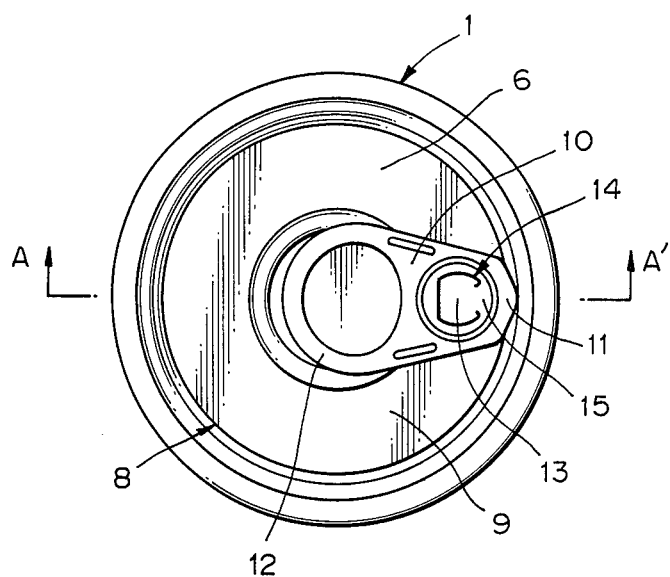
FIG. 5 is a top plan view of the easily openable closure of this invention.
Figure 6:
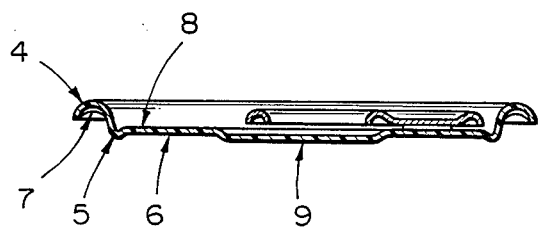
FIG. 6 is a sectional view taken on line A-A' of FIG. 5.
Figure 7:
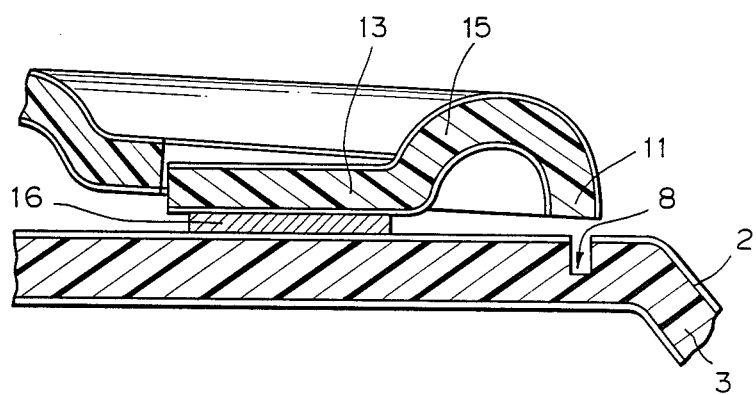
FIG. 7 is an enlarged sectional view of the principal parts of the closure shown in FIG. 5.

As shown in FIGS. 5, 6 and 7, the easily openable closure 1 of this invention is composed of a rigid metallic material having a primer coating 2.

The closure 1 has a circumferential groove portion 4 and a panel portion 6 connected to the groove portion 4 via an annular rim portion 5. The groove 4 has provided therein a sealing compound layer 7 which is to be brought into sealing engagement with a can body flange (not shown) at the time of double seaming. A portion 9 to be opened which is defined by a score 8 exists inwardly of the annular rim portion 5. The portion 9 may substantially correspond with a greater part of the panel portion 6, or be part of the panel portion 6. The score 8 may be provided reaching halfway in the thickness direction of the metallic material 3 as shown in the enlarged sectional view of FIG. 7, and can be sheared easily at the time of opening in the manner described below in detail.

According to this invention, an opening tab 10 is provided in the portion 9 in the specific manner shown below. The opening tab 10 has a score pushing and tearing end 11 at one end, a gripping portion (ring) 12 at the other end, and a support portion 13 interposed between them and adapted to be bonded to the closure. In this specific embodiment, the support portion 13 is formed in a tongue-like shape by providing a nearly U-shaped cut 14 between the end 11 and the ring 12 so that a connecting portion 15 exists between the support portion 13 and the end 11. The tearing end 11 of the opening tab 10 is heat-bonded to the portion 9 of the closure body through a polyamide-type adhesive layer 16 at the tongue-shaped support portion 13 so that its position agrees nearly with the score 8 on the closure body.

When in the closure of the invention, the ring 12 of the tab 10 is held by a finger and lifted upward, this force is transmitted as a downwardly directed force to the pushing-tearing end 11 via the support portion 13. As soon as the downwardly directed tearing force is exerted on the score 8, a peeling force (moment) acts on the adhesive layer 16 between the support portion 13 and the portion 9. According to this invention, the adhesive layer 16 is formed so as to withstand the peeling force by using the specific polyamide-type adhesive. Then, by pulling the tab 10 at an angle of about 90 degrees to the closure 1, the score 8 is sheared from the site of incision.

Metallic blank

The metallic blank used in this invention may be any desired metallic material having resistance to deformation by pressure and rigidity to withstand seaming which is made of, for example, a light metal plate such as aluminum, or a surface-treated steel plate such as a steel sheet plated with zinc, tin, chromium, aluminum, etc. or a steel sheet having a chemically formed film thereon by using chromic acid, phosphoric acid, etc. The material desirably has a thickness of generally 0.10 to 0.40 mm, especially 0.12 to 0.35 mm. The opening tab may also be made of the same metallic materials as exemplified above, especially aluminum.

The closure body of this invention is suitably made from metal materials which are difficult to process by riveting, for example, chromate-surface-treated steel plates, especially an electrolytically chromate-treated steel plate, a chromate-treated nickel-plated steel sheet, a chromate-treated, iron/tin alloy-plated steel plate, a chromate-treated tin/nickel alloy-plated steel sheet, a chromate-treated iron/tin/nickel alloy-plated steel plate and a chromate-treated aluminum-plated steel plate.

The electrolytically chromate-treated steel plate consists of a cold-rolled steel plate substrate and a metallic chromium layer and a non-metallic chromium layer formed thereon. The thickness of the metallic chromium is determined by considering corrosion resistance and processability, and its amount is desirably 30 to 300 mg/m$^2$, particularly 50 to 250 mg/m$^2$. The thickness of the non-metallic chromium layer has to do with the adhesion or peel strength of the coated film, and is desirably 4 to 40 mg/m$^2$, particularly 7 to 30 mg/m$^2$, as the amount of chromium.

Primer

It is the general practice to coat an adhesive primer on the metallic material so as to use the primer also as a protective coating, and to use the primer-coated material for the production of the closure. Any desired primer paint can be used which has excellent adhesion to the metallic plates described above as well as to the polyamide-type adhesive composed of the amide recurring units. Examples of the primer paint are thermosetting or thermoplastic resin paints such as modified epoxy paints such as a phenol/epoxy paint, an amino-epoxy paint or an epoxy/ester paint; vinyl or modified vinyl paints such as a vinyl chloride/vinyl acetate copolymer, a partially saponified vinyl chloride/vinyl acetate copolymer, a vinyl chloride/vinyl acetate/maleic anhydride copolymer, an epoxy modified-, epoxyamino-modified or epoxyphenol-modified vinyl resin paints; acrylic resin type paints; oily paints; alkyd paints; polyester paints; and synthetic rubber-type paints such as a styrene/butadiene copolymer paint.

Typical primer paints having excellent adhesion and corrosion resistance are phenol-epoxy paints composed of resol-type phenol/aldehyde derived from phenols and formaldehyde and bisphenol-type epoxy resins, particularly one containing the phenolic resin and the epoxy resin in a weight ratio of from 90:10 to 5:95. These paints have excellent processability, and have the advantage that even when they are subjected to score formation, the score portion has good corrosion resistance.

The primer coating may be of a single layer or may be composed of a plurality of layers, for example a base coat and a top coat.

The thickness of the primer coating is not particularly restricted so long as the aforesaid objects of the invention are achieved. Generally, it is desirably 0.2 to 30 micrometers, particularly 1 to 20 micrometers.

Polyamide-type adhesive

In the present invention, it is the first requirement to use a polyamide containing 6.1 to 15.0, particularly 7.0 to 14.0, main-chain carbon atoms on an average polyamide group. The polyamide may be a homopolyamide, a copolyamide or a blend thereof obtained by using omega-aminocarboxylic acids and/or diaminedicarboxylic acid salts as starting monomer components. Examples of suitable polyamides are listed below.

| | Homopolyamide | Melting point (°C.) | Saturated water absorption at 20° C.(%) |
|---|---|---|---|
| Nylon 8 | omega-aminocaprylic acid polymer | 200 | 3.8 |
| Nylon 9 | omega-aminopelaronic acid polymer | 210 | 3.0 |
| Nylon 10 | omega-aminodecanoic acid polymer | 188 | 2.0 |
| Nylon 11 | omega-aminoundecanoic polymer | 187 | 1.8 |
| Nylon 12 | omega-aminododecanoic acid polymer | 178 | 1.4 |
| Nylon 13 | omega-aminotridecanoic acid polymer | 170 | 1.04 |
| Nylon 6 10 | polyhexamethylene sebacamide | 225 | 3.5 |
| Nylon 6 12 | polyhexamethylene dodecamide | 212 | — |
| Nylon 6 13 | polyhexamethylene tridecamide | 204 | — |

| | Homopolyamide | Melting point (°C.) | Saturated water absorption at 20° C.(%) |
|---|---|---|---|
| Nylon 10 6 | polydecamethylene adipamide | 225 | — |
| Nylon 10 10 | polydecamethylene sebacamide | 213 | — |
| Nylon 10 12 | polydecamethylene dodecamide | 195 | — |
| Nylon 10 13 | polydecamethylene tridecamide | 187 | — |
| Nylon 12 6 | polydodecamethylene adipamide | 210 | — |
| Nylon 12 10 | polydodecamethylene sebacamide | 190 | — |
| Nylon 12 12 | polydodecamethylene dodecamide | 185 | — |
| Nylon 12 13 | polydodecamethylene tridecamide | — | — |
| Nylon 13 6 | polytridecamethylene adipamide | — | — |
| Nylon 13 10 | polytridecamethylene sebacamide | 170 | — |
| Nylon 13 12 | polytridecamethylene dodecamide | — | — |
| Nylon 13 13 | polytridecamethylene tridecamide | 174 | 0.75 |
| Nylon 10 9 | polydecamethylene azelamide | — | — |
| Nylon 12 9 | polydodecamethylene azelamide | — | — |
| Nylon 13 9 | Polytridecamethylene azelamide | — | — |

The copolyamide or blended polyamide composition may contain omega-aminocaproic acid units, hexamethylene adipamide units, etc. so long as the entire composition meets the requirements described hereinabove.

Preferably, the polyamide used in this invention has a specific viscosity (7γ), measured at 20° C. in 98% sulfuric acid in a concentration of 1 gram in 100 cc of 98% sulfuric acid, of 1.8 to 3.5. If the specific viscosity is lower than the specified limit, the polyamide has poor mechanical properties, and the bonded portion has insufficient strength. If the specific viscosity is higher than the specified limit, the polyamide has too high a melt viscosity at the time of melt-bonding, and the bonding must be carried out at a temperature considerably higher than its melting point.

It is important that the polyamide should have a crystallinity of 15 to 40%, particularly 20 to 35%. Generally, the crystallinity of the polyamide as a bonding support depends also upon the rate of crystallization of the polyamide. The crystallinity of a polyamide having a high rate of crystallization is sometimes difficult to confine within the above-specified range only under the bonding conditions. In this case, it is advantageous to limit the maximum crystallinity to be reached to a low value by introducing different recurring amide units or amide recurring units having a branched chain structure into the polyamide, or blend the polyamide with a dissimilar polyamide, or subject the polyamide to amide exchange reaction.

For this purpose, it is suitable to copolymerize not more than 50% by weight, especially not more than 40% by weight, based on the entire recurring units, of different amide recurring units from the main amide recurring units, or to blend it with a dissimilar polyamide composed of these different recurring units, followed, if required, by amide exchange reaction. For reducing the crystallinity of the resulting polyamide, it is also effective to form a branched chain structure in the polyamide by polycondensing a trifunctional or higher polyamine component, for example a polyalkylene polyamine such as diethylenetriamine, hexamethylenetriamine or triethylenetetramine, or a polycarboxylic acid component, for example an N-alkyl substituted dicarboxylic acid such as benzenehexacarboxylic acid or 1,1,2,3,4,5-hexa-(betacarboxyethyl)cyclopentadiene.

The dynamic modulus of the polyamide depends both upon the recurring structure and crystallinity of the polyamide. According to this invention, they are selected so that the dynamic modulus comes within the range specified hereinabove.

In the preferred polyamide composition, examples of the amide recurring units other than the hexamethylene sebacamide units and the 6-aminocaproic acid units include amide recurring units derived from at least one of laurolactam (omega-aminododecanoic acid), omega-enantholactam, omega-aminoundecanoic acid, omegaaminotridecanoic acid, hexamethylene diammonium adipate, hexamethylene diammonium dodecanoate, hexamethylene diammonium tridecanoate, dodecamethylene diammonium adipate and dodecamethylene sebacate.

As stated hereinabove, the preferred polyamide composition used in this invention may be a blend of two or more of polyamides and copolyamides, an interpolyamide or blocked copolyamide obtained by amide exchange reaction of the above polyamides, or a mixture thereof. Preferably, the hexamethylene sebacamide units exist wholly in the form of a homopolyamide, or partly in the form of a homopolyamide and the remainder in the form of a copolyamide. Likewise, the 6-aminocaproic acid units is present wholly in the form of a homopolyamide. Alternatively, a part of the 6-aminocaproic acid exists in the form of a homopolyamide, and the remainder in the form of a copolyamide. The other amide recurring units generally exist in the form of a copolyamide.

Suitable polyamide compositions are, for example, as follows although the invention is not limited to such examples.

A blend of nylon 6,10 and nylon 6/610 copolymer,
a blend of nylon 6,10 and nylon 6/612 copolymer,
a blend of nylon 6,10 and nylon 6/66/610 copolymer, and
a blend of nylon 6,10 and nylon 6/66/612 copolymer.

Additives such as antioxidants, heat stabilizers, ultraviolet absorbers, viscosity adjusting agents, plasticizers, nucleating agents, inorganic fine particles, fillers, organic slip agents, and pigments may be added to the polyamide-type adhesive used in this invention in an amount not exceeding 20% by weight based on the entire adhesive composition so long as they do not significantly impair the bonding characteristics of the adhesive. Resins other than polyamides, for example polyolefin resins such as polyethylene or polypropylene and rubbers such as isoprene rubber, butadiene rubber or styrene/butadiene copolymer may also be incorporated in amounts which do not impair the bonding characteristics of the adhesive.

Method of Production

In the production of the easily openable can closure of this invention, the primer paint is first applied to the metal blank in the form of an organic solvent solution, an aqueous dispersion or an aqueous solution by an ordinary coating method such as spray coating, roller coating, dip coating, electrostatic coating, or electrophoretic coating, and then dried or baked to form a primer coating.

The coated blank is then punched out into a predetermined closure size, and pressed into a closure of a predetermined shape. Simultaneously with this, or in a separate step, a score is formed on the closure. The score formation is desirably such that the residual thickness of the score portion is ⅛ to ½ of the thickness of the blank and its absolute thickness is in the range of 0.2 to 0.9 mm, especially 0.3 to 0.8 mm.

Before or after the score formation, a sealing compound composition comprising a synthetic rubber latex such as a styrene/butadiene rubber latex, a tackifier and a filler is applied to the circumferential groove portion of the closure and dried to form a compound layer.

A layer of the polyamide-type adhesive is provided in the support portion of an opening tab separately produced, or at that part of the closure on which to provide the opening tab. Of course, the adhesive layer may be provided on both of these parts. The adhesive layer may be formed typically be applying a film of the adhesive cut to a predetermined size to the required part. Alternatively, the adhesive may be applied in the form of a powder, a melt, a suspension or a solution. The suitable thickness of the adhesive layer is in the range of 3 to 150 micrometers, especialy 10 to 100 micrometers.

Thereafter, the opening tab is positioned on the closure. The polyamide resin located between the support portion of the tab and the closure is melted and then solidified by cooling to complete bonding of the two.

In cans for holding foods, the score is desirably formed over the entire circumference of the closure in proximity to the annular rim portion to provide a so-called full-open type. If desired, it may be formed in any other desired shape such as a rain drop or a semicircular shape partly on the closure.

Advantage

According to the present invention, there is provided an easily openable closure to which an opening tab is bonded and fixed and which withstand baking of a repair paint film or retorting. In addition, although the closure is formed of a rigid metal blank used for lap seaming with a can body, the destruction of the bonded support point is effectively prevented, and the opening operation can be stably carried out even after a lapse of a long period of time.

The following Examples illustrate the present invention more specifically.

The properties of the adhesive and the properties of the bonded structure were evaluated by the following methods.

Evaluation of the properties of the adhesive

1. Average number of main-chain carbon atoms per amide group

In the following example, the average number of mainchain carbon atoms was calculated from the amounts of the monomer charged in the production of the polyamide. It is also possible to determine it by directly hydrolyzing the polyamide and analyzing it by gas chromatography or the like. The difference between them was 5% at the largest. When the adhesive contains another resin such as a polyolefin, it is excluded from the object of calculation.

2. Crystallinity

The crystallinity of the polyamide resin was measured mainly by a broad angle X-ray diffraction method using a standard sample of a known crystallinity. In view of the accuracy of measurement of crystallinity, it can also be measured by a density method or a calorimetric method such as differential thermal analysis if the correspondence of the result obtained by the X-ray diffraction method to the result obtained by the other method is confirmed. The test sample was obtained by dissolving or shaving off the metal from cans actually tested. In the density method or the calorimetric method, the weight or volume of the adhering primer was corrected in calculating the density. For each sample No., three test pieces were used, and an arithmetic mean of the measured values of the three test pieces was determined and used as a measured value.

3. Dynamic modulus

There are various principles and methods of measuring dynamic modulus, which are used according to the shape of the sample, for example. In the following examples, it was measured at 110 Hz by means of Leovibron DDV-II made by Toyo Baldwin Co. The test pieces were taken from cans subjected to an actual can test, and the effect of the adhering primer on the measured value of the dynamic modulus was corrected by using a parallel model of the following equation.

$$E = x_p E_p + (1 - x_p) E_a$$

wherein $x_p$ is the proportion of the thickness of the primer layer occupying the thickness of the test piece when the total thickness of the test piece is taken as 1, E is the dynamic modulus of the test piece actually measured, $E_p$ is the dynamic modulus of the primer, and $E_a$ is the dynamic modulus of the adhesive layer.

The test pieces were used in the measurement after they were left to stand for a sufficiently long period of time in an atmosphere having a relative humidity of not more than 20%. The dynamic modulus of the polyamide so measured tended to be 5 to 20% higher than that of the original polyamide before bonding. But within the range of measuring accuracy, it agreed nearly with the dynamic modulus of the polyamide which was heated in an oven after bonding. For each sample No., three test pieces were used, and an arithmetic mean of the measured values of the three test pieces was calculated and used as a measured value.

4. Thermal properties (melting point and crystal fusion heat variation)

The thermal properties were measured by a differential scanning calorimeter (Model DSC-2C, made by Perkin-Elmer Co.) using indium as a standard sample. By utilizing a computer system built up in this device, base line correction and calorie calculation were carried out. The measuring conditions were: sample weight 3–5 mg; temperature elevation rate 10° C./min; nitrogen stream. An original film of the adhesive could be used as the sample. But to ensure accuracy in determining the crystal fusion heat variation, the sample was taken from the bonded structure obtained by an actual bonding operation followed by heating or the like, or from the bonded portion of a container.

In the case of the crystal fusion heat variation, a temperature elevation curve up to about the melting point (Tm)+30° C. on the sample was determined measurement (1). Then, the sample was quenched from this temperature at 320° C./min. and a temperature elevation curve was again determined measurement (2). In the equation (1) defining the crystal fusion heat variation, the amount of heat of fusion measured by measurement (1) corresponds to $S_1$, and the amount of heat of fusion measured by (2), to $S_0$. In the case of a blended resin, a plurality of fusion peaks were sometimes observed. The highest temperature was evaluated as the melting point. In determining the crystal fusion heat variation, all peaks were made the object of evaluation.

Evaluation of the properties of the bonded structure

1. Peel strength

The tab was bonded under predetermined bonding conditions, and the peel strength was measured by the following method. The tab was lifted to perform early opening of the score portion, and the tab was raised in a direction perpendicular to the panel surface of the closure. The tab ring was pulled perpendicularly to the panel surface so that the bonded portion underwent 90° peel. This tensile test was carried out by using an Instron tensile tester at a pulling speed of 200 mm/min. at room temperature, and the initial strength and the peeling work were determined. The peeling work was determined by integrating the area of the peel strength curve on a chart by an automatic integrator, and calculating the resulting integral value for 1 cm$^2$ of the bonded area. Five measurements were made for each sample No., and an arithmetic mean of the measured values was determined and used as a measured value.

2. Closure openability

Twenty panelists each opened five cans (total 100 cans) in each of the following cases (1) to (4). The results were shown by the number of cans which could not be opened due, for example to detachment of the tap during opening and the number of those cans in such cans which could not be opened in the initial stage (the latter being in the parentheses).

(1) Immediately after bonding.

(2) A repair paint was coated on the score portion on the outside and inside surface of the closure and then baked in an oven.

These closures were double-seamed to 211-diameter flange can bodies and dressing tuna was filled. Flat closures were seamed. The cans were then retorted at 116° C. for 90 minutes.

(3) Immediately after retorting.

(4) After passage of 6 months at 37° C.

EXAMPLE 1

An epoxy-phenol type paint was coated to a thickness after baking of 5 micrometers, and baked at 210° C. for 10 minutes on both surfaces of an ordinary tin-free steel (TFS) plate having a thickness of 0.20 mm and a nonmetallic chromium layer (15 mg/m$^2$) and a metallic chromium layer (100 mg/m$^2$) on its surface. A closure for 221 diameter was formed from the coated TFS plate by a press. A score was formed in a circular shape with a diameter of 58 mm on the outerside surface of the closure so that ratio of the remaining thickness of the score to the thickness of the steel plate was 0.23. An epoxyphenol type paint was coated on the adhesive applied side of an aluminum foil (#5082) material having a thickness of 0.46 to a thickness after baking of 5 micrometers, and an epoxy urea-type paint was coated on the opposite side of the plate to a thickness after baking of 5 micrometers. The aluminum foil plate was slit to a width of 30 mm. A microslit film having a thickness of 50 micrometers and a width of 8 mm and the composition shown in Table 1 was laminated to the sit aluminum foil by high frequency induction heating, and the foil was press-formed into a tab having the shape shown in the drawings. The tab was heated by high frequency induction heating to a temperature at least 30° C. higher than the melting point of the adhesive, and bonded to the closure so that the distance from the score to the bonding support was 6 mm. At this time, the width of the adhesive layer at the bonding support was about 7 mm, and the area of the bonded portion was about 40 mm$^2$.

In the bonding operation using adhesives Nos. 2 and 9, the closure after heat bonding was quenched by striking it with a cooling member through which a cooling medium at about $-30°$ C. was circulated.

After bonding, in samples Nos. 1 to 7, an epoxyphenol type paint was coated on the score portion on the inside and outside surfaces and baked at 200° C. for 4 minutes. In samples Nos. 8 to 13, an epoxy-type water-base paint was coated likewise and baked at 170° C. for 4 minutes after the bonding operation.

Table 1 shows the bonding properties of the closures so produced together with the properties of the adhesives used.

The results show that if the polyamide-type adhesive has less than 6.0 main-chain carbon atoms on an average per amide group, the initial peel strength is relatively high but no sufficient peeling work can be obtained, and that as regards closure openability, the closure can be opened to some extent in the initial stage, but the shearing of the score portion is difficult and the tab tends to be detached from the bonding support. Furthermore, when the average number of main-chain carbon atoms per amide group is larger than 15.0, the peeling strength in the initial stage is low and the initial opening of the closure becomes extremely difficult. The tab is dislocated and peeling occurs. Consequently, the detachment of the tab tends to increase. When the average number of main-chain carbon atoms per amide group is 6.1 to 15.0, the peel strength is well balanced, and the openability of the can is good in all cases. Furthermore, the closures showed stable opening property even after storage as actual cans holding an article.

EXAMPLE 2

Tab-bonded closures were produced and evaluated in the same way as in Example 1 except that the adhesives indicated in Table 2 were used.

In samples Nos. 15 and 17, a nucleating agent was added to the adhesives to change the crystallization characteristics of the resins greatly. In samples Nos. 14 and 15, the epoxy-phenol type paint as used in Example 1 was used as a repair paint for the score portion, and baked at 200° C. for 4 minutes. In samples Nos. 17 to 22, the same epoxy-type aqueous paint as used in Example 1 was used and baked at 170° C. for 4 minutes. In sample No. 16, an epoxy-acrylic paint was used and baked at 175° C. for 10 minutes. Table 2 shows the bonding properties of the closures so produced together with the properties of the adhesives.

The results show the following fact. If the crystallinity of the polyamide-type adhesive exceeds 40 %, the peel strength in the initial stage is high to some extent, but no sufficient peeling work is obtained. At the time of opening, the opening can be carried out in the initial stage, but at the time of shearing the score portion, the detachment of the tab occurs pronouncedly, and it is extremely difficult to open the closure. If the crystallinity of the polyamide-type adhesive is lower than 15%, the peel strength in the initial stage is not sufficiently high, and the initial opening tends to become difficult. Dislocation of the tab or peeling occurs and consequently, the tab is detached. This tendency is increased immediately after retorting. When the crystallinity of the polyamide-type adhesive is 15 to 40%, the peel strength is well balanced, and the closure had good openability. In particular, even after retorting or after storage, the openability of the closure remains good.

EXAMPLE 3

Tab-bonded closures were produced and evaluated in the same way as in Example 1 except that an aluminum material (#5082) having a thickness of 0.35 was used as the closure material and the adhesives indicated in Table 3 were used.

In samples Nos. 25 and 26, the polyamide resin was mixed with glass fibers to change the dynamic moduli of the adhesives. In samples Nos. 23 to 28, the same epoxyphenol type paint as used in Example 1 was used as a repair paint for the score portion and baked at 200° C. for 4 minutes. In samples Nos. 29 to 31, the same epoxy-type water-base paint as used in Example 1 was used, and baked at 170° C. for 4 minutes. Table 3 shows the bonding properties of the closures so produced together with the properties of the adhesives.

The results show the following fact. If the dynamic modulus of the polyamide-type adhesive at 25° C. and a relative humidity of not more than 20% exceeds $3.5 \times 10^{10}$ dynes/cm$^2$, no sufficient peeling work can be obtained in regard to the peel strength, and the tab is frequently detached during shearing of the score portion. Furthermore, since the initial strength is low, the initial openability of the closure tends to be reduced. Hence, the closure has very poor openability. If the dynamic modulus is below $0.8 \times 10^{10}$ dynes/cm$^2$, the peel strength in the initial stage is markedly reduced, and the initial opening tends to become difficult. Furthermore, the tab is frequently detached owing to dislocation and peeling. When the dynamic modulus of the polyamide-type adhesive is in the range of $0.8 \times 10^{10}$ to $3.5 \times 10^{10}$ dynes/cm$^2$, an initial strength or a peeling work above a certain level can be ensured with regard to the peel strength. Hence, the initial opening of the closure can be carried out stably, and at the time of shearing the score portion, the bonding support point is not dislocated, and the opening can be carried out stably.

EXAMPLE 4

As a closure material, (1) a tin-plated steel plate having a thickness of 0.23 and (2) a thin nickel-plated steel plate having a thickness of 0.23 were used an epoxy-urethane type adhesive was spot-coated at that portion of the outside surface of each plate which was around a tab bonding portion. Thereafter, an epoxyphenol type paint was coated entirely on the inside and outside surfaces of the plate excepting the spot-coated portion to a thickness after baking of 5 micrometers, and then baked at 210° C. for 10 minutes. Molding of closures from the closure materials and subsequent steps were carried out as in Example 1. Tabs were heat-bonded to the closures using the same adhesives as used in preparing samples Nos. 5 and 18 under predetermined conditions. Then, the score portion was coated with the same epoxyphenol paint and epoxy-type aqueous paint as in Example 1, followed by baking. Thus, repainted closures were obtained. The bonding properties of the tabs were evaluated using these closures.

The strength of a sample obtained by using the adhesive of sample No. 5 was expressed by an initial strength of 12.6 kg and a peeling work of 4.8 kg.cm. A sample obtained by using the adhesive used in producing sample N. 18 had an initial strength of 11.6 kg and a peeling work of 11.6 kg-cm. Thus, the strength was stable, and there was no problem in the openability of the closures.

TABLE 1

| No. | Composition (melting point, °C.) | Adhesive Physical properties | | |
|---|---|---|---|---|
| | | average number of main-chain carbon atoms per amide group | Crystallinity (%) | Dynamic modulus ($\times 10^{10}$ dyne/cm$^2$) |
| 1 | nylon 66 (255) | 6.0 | 45 | 4.8 |
| 2 | nylon 6, nylon 6/66 copolymer blend; blend ratio 90:10 (~10) | 6.0 | 37 | 3.5 |
| 3 | nylon, nylon 6/66/610 copolymer blend; blend ratio 80:20 (205) | 6.1 | 36 | 3.3 |
| 4 | nylon, nylon 6/2 blend; blend ratio 80:20 (212) | 6.6 | 33 | 3.0 |
| 5 | nylon 610, nylon 6/66/610 copolymer blend; blend ratio 80:20 (222) | 7.7 | 34 | 2.7 |
| 6 | nylon 610 (225) | 8.0 | 38 | 2.8 |
| 7 | nylon 612 (212) | 9.0 | 17 | 1.3 |
| 8 | nylon 11 (185) | 11.0 | 33 | 1.5 |
| 9 | nylon 12 (178) | 12.0 | 30 | 1.8 |
| 10 | nylon 12, dimeric acid-type polyamide blend; blend ratio 80:20 (177) | 13.8 | 24 | 1.6 |
| 11 | nylon 12, dimeric acid-type polyamide blend; blend ratio 70:30 (177) | 14.7 | 21 | 1.3 |
| 12 | nylon 12, dimeric acid polyamdie blend; blend ratio 60:40 (175) | 15.2 | 18 | 1.0 |
| 13 | dimeric acid-type polyamide (dimeric acid, azelaic acid type) (173) | 16.5 | 15 | 0.85 |

| Peel strength | | Adhesion property Closure openability | | |
|---|---|---|---|---|
| Initial strength | Peeling work | Immediately | After heating | Actual can test |
| | | | | immediately / after passage |

TABLE 1-continued

| No. | (kg) | (kg · cm) | after bonding | in an oven | after | of time |
|---|---|---|---|---|---|---|
| 1 | 8.2 | 2.2 | 34(3) | 52(1) | 44(8) | 63(21) |
| 2 | 7.4 | 2.6 | 16(1) | 35(0) | 26(4) | 45(13) |
| 3 | 12.8 | 4.4 | 0 | 0 | 0 | 0 |
| 4 | 11.5 | 8.2 | 0 | 0 | 0 | 0 |
| 5 | 15.6 | 8.4 | 0 | 0 | 0 | 0 |
| 6 | 15.2 | 9.0 | 0 | 0 | 0 | 0 |
| 7 | 14.2 | 10.2 | 0 | 0 | 0 | 0 |
| 8 | 12.2 | 9.8 | 0 | 0 | 0 | 0 |
| 9 | 13.4 | 9.6 | 0 | 0 | 0 | 0 |
| 10 | 12.1 | 10.4 | 0 | 0 | 0 | 0 |
| 11 | 8.1 | 4.2 | 1(1) | 0 | 0 | 0 |
| 12 | 6.2 | 2.4 | 32(25) | 18(8) | 26(12) | 42(23) |
| 13 | 2.5 | 1.4 | 83(75) | 63(34) | 72(63) | 95(86) |

TABLE 2

| | | Adhesive | | |
|---|---|---|---|---|
| | | Physical properties | | |
| No. | Composition (melting point, °C.) | average number of main-chain carbon atoms per amide group | Crystallinity (%) | Dynamic modulus ($\times 10^{10}$ dyne/cm$^2$) |
| 14 | nylon 6 (220) | 6.0 | 43 | 3.5 |
| 15 | nylon 610 (228) (nucleating agent added) | 8.0 | 43 | 3.4 |
| 16 | nylon 10 (188) (after-heated) | 10.0 | 41 | 2.9 |
| 17 | nylon 12 (180) (nucleating agent added) | 12.0 | 37 | 2.3 |
| 18 | nylon 12, nylon 6/12 copolymer blend; blend ratio 80:20(178) | 11.6 | 26 | 1.5 |
| 19 | nylon 12, nylon 6/12 copolymer blend; blend ratio 60:40 (176) | 11.0 | 16 | 1.2 |
| 20 | nylon 12, nylon 6/12 copolymer blend; blend ratio 40:60 (173) | 10.4 | 14 | 1.2 |
| 21 | nylon 6/12 copolymer (176) | 9.2 | 8 | 0.9 |
| 22 | dimeric-type polyamide (182) | 14.3 | 6 | 0.8 |

| | Adhesion property | | | | | |
|---|---|---|---|---|---|---|
| | Peel strength | | Closure openability | | | |
| | Initial | Peeling | | | Actual can test | |
| No. | strength (kg) | work (kg · cm) | Immediately after bonding | After heating in an oven | immediately after | after passage of time |
| 14 | 7.9 | 2.0 | 12(4) | 41(6) | 31(12) | 49(21) |
| 15 | 8.2 | 1.6 | 1(0) | 8(1) | 2(0) | 8(1) |
| 16 | 8.5 | 4.6 | 0 | 4(0) | 0 | 6(0) |
| 17 | 14.2 | 10.8 | 0 | 0 | 0 | 0 |
| 18 | 13.0 | 11.6 | 0 | 0 | 0 | 0 |
| 19 | 12.8 | 10.6 | 0 | 0 | 0 | 0 |
| 20 | 8.6 | 2.6 | 0 | 1(0) | 0 | 3(1) |
| 21 | 7.1 | 2.2 | 4(3) | 6(6) | 11(8) | 21(13) |
| 22 | 3.1 | 1.8 | 12(10) | 12(10) | 53(21) | 72(63) |

TABLE 3

| | | Adhesive | | |
|---|---|---|---|---|
| | | Physical properties | | |
| No. | Composition (melting point, °C.) | average number of main-chain carbon atoms per amide group | Crystallinity (%) | Dynamic modulus ($\times 10^{10}$ dyne/cm$^2$) |
| 23 | nylon 4,6 (300) | 5.0 | 39 | 5.7 |
| 24 | m-xylylene adipamide (243) | 7.0 | 27 | 4.0 |
| 25 | nylon 610 (223) (containing 20% wt. of glass fibers) | 8.0 | 34 | 3.6 |
| 26 | nylon 610 (224) (containing 10 wt % of glass fibers) | 8.0 | 35 | 3.3 |
| 27 | nylon 610, polyethylene blend; blend ratio 85:15 (222) | 8.0 | 30 | 2.0 |
| 28 | nylon 610, nylon 6/66/610 copolymer blend; blend ratio 40:60 (217) | 6.2 | 16 | 1.1 |
| 29 | nylon 12, dimeric acid-type polyamide blend; blend ratio 65:35 (176) | 14.3 | 16 | 0.82 |
| 30 | nylon 12, dimeric acid-type polyamide blend; blend ratio 30:70 (173) | 14.6 | 12 | 0.76 |
| 31 | dimeric acid-type polyamide | 15.6 | 9 | 0.68 |

TABLE 3 -continued (dimeric acid, a zelaic acid, adipic acid type) 175)

| | Peel strength | | Adhesion property | | | |
|---|---|---|---|---|---|---|
| | Initial | Peeling | Closure openability | | | |
| | strength | work | Immediately | After heating | Actual can test | |
| No. | (kg) | (kg · cm) | after bonding | in an oven | immediately after | after passage of time |
| 23 | 4.4 | 1.4 | 56(18) | 89(26) | 42(19) | 78(26) |
| 24 | 9.2 | 1.6 | 34(0) | 42(6) | 14(1) | 33(19) |
| 25 | 10.2 | 2.8 | 3(0) | 16(0) | 0 | 0 |
| 26 | 11.3 | 6.6 | 0 | 0 | 0 | 0 |
| 27 | 10.6 | 5.6 | 0 | 0 | 0 | 0 |
| 28 | 12.6 | 9.4 | 0 | 0 | 0 | 0 |
| 29 | 11.2 | 3.8 | 1(1) | 0 | 0 | 0 |
| 30 | 7.3 | 2.7 | 3(3) | 1(1) | 0 | 0 |
| 31 | 3.2 | 2.2 | 44(42) | 21(18) | 18(15) | 29(26) |

EXAMPLE 5

An epoxy-phenol type paint was coated on both surfaces of an ordinary tin-free steel (TFS) plate having a thickness of 0.22 mm and a non-metallic chromium layer (15 mg/m$^2$) and a metallic chromium layer (100 mg/m$^2$) on its surface to a thickness after baking of 5 micrometers, and baked at 210° C. for 10 minutes. Two test pieces having a width of 5 mm and a length of 10 cm were cut out from the coated plate. A film of each of the adhesives shown in Table 4 was interposed between the two test pieces and then the test pieces were bonded by using high frequency heating. The bonding temperature was such that the entire bonded surface became a temperature equal to the melting point of the adhesive plus 30° C. Some of such bonded pieces were heated in an oven at 200° C. for 4 minutes in order to examine the effect of after-heating. Five test pieces each immediately after bonding and after the after-heating were subjected to a T peel test by an Instron tensile tester at a pulling speed of 200 mm/min in room temperature, and an arithmetic mean of the measured values of the five test pieces was calculated. Table 4 shows the compositions and properties of the adhesives, and the adhesion strengths.

The results show the following fact. When the polyamide-type adhesive is composed entirely or substantially of hexamethylene sebacamide units, the initial adhesion strength is high to some extent but the adhesion strength is markedly decreases presumably because the after-heating greatly promotes crystallization of the adhesive. Furthermore, when the proportion of the hexamethylene sebacamide units is extremely small, a high initial strength cannot be obtained or the heat resistance of the adhesive is insufficient. When the adhesive contains no 6-aminocaproic acid units, the initial strength is low and tends to be markedly reduced by after-heating. If, on the other hand, the proportion of the 6-aminocaproic acid units is very large, the adhesive has heat resistance but no sufficient initial strength can be obtained. On the other hand, when the proportion of amide recurring units other than the hexamethylene sebacamide and 6-aminocaproic acid units increases, a satisfactory initial strength cannot be obtained (when the resin is high-melting). When the resin is low-melting, the heat resistance of the adhesive is insufficient. By after-heating, foaming occurs and the adhesion strength is greatly lowered.

EXAMPLE 6

An epoxy-phenol type paint was coated on both surfaces of an ordinary tin-free steel (TFS) plate having a thickness of 0.20 mm and a non-metallic chromium layer (15 mg/m$^2$) and a metallic chromium layer (100 mg/m$^2$) on its surface to a thickness after baking of 5 micrometers, and then baked at 210° C. for 10 minutes. The coated TFS plate was formed into a closure for 211 diameter. A sealing compound was applied to its curled portion and dried in a customary manner. Then, a score was formed in a circular shape with a diameter of 58 mm on the outside of the closure so that the ratio of the remaining thickness of the score portion to the thickness of the steel plate became 0.23. An epoxyphenol type paint was coated on the adhesive-applied side of an aluminum foil (#5082) to a thickness after baking of 5 micrometers. An epoxy-urea type paint was coated on the opposite side of the aluminum foil to a thickness after baking of 5 micrometers. Then, the aluminum foil was slit to a width of 30 mm. A microslit film having a thickness of 45 to 50 micrometers and a width of 8 mm and the composition shown in Table 4 was laminated by high frequency induction heating to the aluminum foil, and the laminated material was formed into a tab shown in FIG. 5 by press-forming. The tab was heated to a temperature at least 30° C. higher than the melting point of the adhesive by high-frequency heating and bonded to the closure so that the distance from the score to the bonding support became 6 mm. The width of the adhesive layer at the bonding support was about 7 mm, and the area of the bonded portion was about 40 mm$^2$.

An epoxy-phenol type paint was coated on the score portion on the inside and outside surfaces of the closure to which the tab had been bonded, and baked at 200° C. for 4 minutes. The peel strength of the closure was measured. The openability of the closure was also evaluated. The results are summarized in Table 4.

The openability of the closure to which the tab was bonded by using each of the adhesives was seen to have a corresponding relationship to the adhesion strength measured in Example 5. When a high initial strength is not obtained because of the composition of the adhesive, the closure strongly tends to become difficult of opening as a result of, for example, detachment of the tab in the early stage of opening. Poor openability also tends to increase when a high initial strength is obtained but after-heating induces marked crystallization of the adhesive and thus decreases the adhesion strength.

EXAMPLE 7

Bonded test pieces were prepared in the same way as in Example 5 except that an aluminum material (#5082) having a thickness of 0.32 was used as the closure material and the adhesive indicated in Table 5 were used. Some of them were heated in an oven at 200° C. for 4 minutes. The adhesion properties of the test pieces was evaluated. In sample Nos. 123, a nucleating agent was added in a predetermined amount to the resin in order to change the crystallization characteristics of the resin. The adhesives used in samples Nos. 125 to 129 were obtained by melt-mixing the resin having the composition shown for sample No. 124 within an extruder for the times indicated in the table, and molding the mixture into a film. As the melt-mixing time becomes longer, the amide exchange reaction proceeds as is characteristic of the polyamide resin. As result, the melting point and the crystallization characteristics of the adhesive change greatly. In order to prevent the thermal degradation and the crosslinking reaction of the resin during the melt-mixing as much as possible, the resin chips were sufficiently dried, and a heat stabilizer was added in an amount twice that conventionally used.

The results show the following fact. The addition of the nucleating agent markedly increases the melting point. When the crystal fusion heat variation increases, the initial adhesion decreases. In addition, the strength is markedly reduced by after-heating. In particular, there is a tendency to marked destruction between primer-coated plates. When the amide exchange reaction is promoted by performing the melt-mixing for a long time, the melting point tends to be lowered. Furthermore, by the after-heating, the reduction of the adhesion strength and foaming become pronounced.

EXAMPLE 8

Tab-bonded closures were prepared in the same way as in Example 5 except that an aluminum material (#5082) was used as the closure material and the adhesives indicated in Table 5 were used. The closures were subjected to openability tests.

A good corresponding relation was observed between the openability of the closure of aluminum and the adhesion strength as in the closures of TFS (Examples 5 and 6). When the crystallization characteristics of the adhesive are greatly changed by adding a nucleating agent or the melting point of the adhesive is lowered by melt-mixing, the heat resistance of the bonded portion is reduced. Consequently, the tab may be detached at the time of opening as a result of heating in an oven, or the tab is dislocated. Hence, there is a marked tendency to a failure of initial opening of the closure.

EXAMPLE 9

As a closure material, (1) a tin-plated steel plate having a thickness of 0.23 and (2) a thin nickel-plated steel sheet having a thickness of 0.23 were used. An epoxy-urethane adhesive was spot-coated around that part of the outside surface of the plate to which a tab was to be bonded. Then, the plate was entirely coated with an epoxy-phenol type paint excepting the spot-coated portions on the inside and outside surfaces to a thickness after baking of 5 micrometers, followed by baking at 210° C. for 10 minutes. Molding of closures from the above closure materials and subsequent steps were the same as in Example 6. Tables were heat-bonded to the closures under predetermined conditions using the adhesives for samples Nos. 105 and 124. The score portion was then coated with the same epoxy-phenolic paint as used in Example 6, followed by baking to form re-painted closures.

These closures were also subjected to the same openability tests as in Example 6. They had good openability under the test conditions, and no problem arose.

The preferred adhesive of this invention is especially useful as a side lap seam adhesive for producing metallic can bodies from the aforesaid metallic blanks, particularly a tin-free steel plate having a primer coating.

Bonded cans obtained by using the closure of this invention have excellent heat resistance at the seams when they are subjected to hot filling, retorting, and aseptic filling. Thus, the melting or crystallization of the adhesive at the time of heat sterilization is prevented, and after heat-treatment, high adhesion strength and heat deformation resistance are retained.

The preferred polyamide-type adhesive of this invention us also useful in heat-bonding and fixing an opening tab to that portion of a score-bearing can closure which is to be opened and has the advantage that under baking conditions for score repairing paints or under retorting conditions, heat deformation of the support of the opening tab or the reduction of its adhesion strength can be effectively inhibited.

TABLE 4

| No. | Composition (copolymerization ratio), ($\eta_{rel}$), blend ratio | Adhesive Constituent units (wt. %) hexa-methylene sebacamide | 6-amino-caproic acid | Other amide recurring units | Physical properties Crystallinity (%) | Dynamic modulus ($\times 10^{10}$ dyne/cm$^2$) | Melting point (Tm °C.) | Crystal fusion heat variation (R) (%) |
|---|---|---|---|---|---|---|---|---|
| 101 | nylon 610 (3,5) | 100 | 0 | 0 | 41 | 3.4 | 223 | 17 |
| 102 | nylon 610 (2,3): nylon 6/610 (4/96) (2,5); 50:50 | 98 | 2 | 0 | 38 | 3.2 | 227 | 14 |
| 103 | nylon 610 (2,7): nylon 6/610 (60/40) (2,7); 95:5 | 97 | 3 | 0 | 35 | 2.9 | 226 | 12 |
| 104 | nylon 610 (2,7): nylon 6/66/610 (30/20/50) (2,7): 84:16 | 92 | 4.8 | 3.2 | 34 | 2.8 | 225 | 8 |
| 105 | nylon 610 (2,8): nylon 6/66/610 (30/40/30) (2,7); 80:20 | 86 | 6 | 8 | 32 | 2.6 | 223 | 6 |
| 106 | nylon 610 (3.0): nylon 6/66/610 (30/40/30) (2,7): | 79 | 9 | 12 | 28 | 2.2 | 222 | 4 |

TABLE 4-continued

| No. | | | | | | | |
|---|---|---|---|---|---|---|---|
| 107 | 70:30<br>nylon 610 (3,0):<br>nylon 6/66 (50/50) (2,8);<br>66:34 | 66 | 17 | 17 | 26 | 2.0 | 221 | 7 |
| 108 | nylon 610 (2,7):<br>nylon 6/66/610 (44/44/12) (2,6);<br>50:50 | 56 | 22 | 22 | 26 | 2.3 | 220 | 6 |
| 109 | nylon 610 (2,4):<br>nylon 6/66/610 (42/42/16) (2,5);<br>45:55 | 54 | 23 | 23 | 13 | 1.2 | 216 | 3 |
| 110 | nylon 6/66/610 (30/26/44) (2,7) | 44 | 30 | 26 | 7 | 0.8 | 168 | 2 |
| 111 | nylon 610 (2,6):<br>nylon 66/610 (60/40) (2,6); 75:25 | 85 | 0 | 15 | 29 | 3.7 | 225 | 10 |
| 112 | nylon 610 (2,6):<br>nylon 6/66 (10/90) (2,5); 90:10 | 90 | 1 | 9 | 31 | 2.6 | 224 | 6 |
| 113 | nylon 610 (3,2)<br>nylon 6/66/610 (47/23/30) (2,7);<br>70:30 | 79 | 14 | 7 | 24 | 1.6 | 221 | 5 |
| 114 | nylon 610 (2,3):<br>nylon 6/610 (70/30) (3,2); 55:45 | 68 | 32 | 0 | 22 | 1.7 | 223 | 6 |
| 115 | nylon 610 (2,7):<br>nylon 6 (2,5); 63:37 | 63 | 37 | 0 | 38 | 3.6 | 226 | 15 |
| 116 | nylon 6/610 (41/59) (2,8) | 59 | 41 | 0 | 12 | 2.1 | 190 | 3 |
| 117 | nylon 610 (2,7):<br>nylon 6/612 (50/50) (2,7); 80:20 | 80 | 10 | 10 | 29 | 2.2 | 222 | 4 |
| 118 | nylon 610 (2,7):<br>nylon 6/66/612 (20/10/70) (2,6);<br>70:30 | 70 | 6 | 24 | 26 | 1.8 | 218 | 5 |
| 119 | nylon 610 (2,7):<br>nylon 6/66/612 (11/39/50) (2,6);<br>62:38 | 62 | 4 | 34 | 23 | 1.3 | 215 | 8 |
| 120 | nylon 610 (2,7):<br>nylon 6/66 (3/97) (2,9); 62:38 | 62 | 1 | 37 | 32 | 3.6 | 232 | 11 |
| 121 | nylon 610 (2,7):<br>nylon 6/612 (3/97) (2,8); 60:40 | 60 | 1.2 | 38.8 | 14 | 1.2 | 214 | 13 |
| 122 | nylon 610/612 (60/40) (2,8) | 60 | 0 | 40 | 3 | 0.7 | 205 | 8 |

Adhesion property

| | Adhesion strength (kg/5 mm width) | | Peel strength | | Closure openability | | | |
|---|---|---|---|---|---|---|---|---|
| | | | | | Immediately after | After heating in oven | Actual can test | |
| No. | immediately after bonding | after the after-heating | initial strength (kg) | Peeling work (kg · cm) | | | Immediately after | After passage of time |
| 101 | 4.2 | 1.2 | 9.2 | 2.4 | 0 | 18(13) | 0 | 24(20) |
| 102 | 4.4 | 1.0 | 11.5 | 2.6 | 0 | 5(1) | 0 | 7(2) |
| 103 | 4.6 | 2.1 | 11.3 | 3.9 | 0 | 0 | 0 | 0 |
| 104 | 5.2 | 5.4 | 12.6 | 8.2 | 0 | 0 | 0 | 0 |
| 105 | 5.3 | 5.3 | 13.2 | 8.9 | 0 | 0 | 0 | 0 |
| 106 | 4.9 | 5.0 | 12.3 | 9.2 | 0 | 0 | 0 | 0 |
| 107 | 4.3 | 4.5 | 10.5 | 6.8 | 0 | 0 | 0 | 0 |
| 108 | 2.6 | 2.0 | 12.4 | 5.6 | 0 | 1(0) | 0 | 0 |
| 109 | 1.5 | 1.2 | 9.6 | 4.5 | 9(2) | 16(3) | 2(0) | 18(5) |
| 110 | 3.3 | 0.3 (foamed) | 5.4 | 2.2 | 0 | 93(84) | 72(63) | 91(85) |
| 111 | 1.2 | 0.7 | 7.2 | 3.5 | 23(2) | 33(12) | 10(1) | 39(21) |
| 112 | 2.1 | 1.3 | 9.6 | 4.9 | 0 | 3(0) | 0 | 0 |
| 113 | 5.5 | 5.2 | 13.1 | 9.8 | 0 | 0 | 0 | 0 |
| 114 | 3.6 | 3.2 | 10.8 | 7.2 | 0 | 1(0) | 0 | 0 |
| 115 | 1.6 | 1.2 | 8.5 | 1.9 | 5(0) | 42(33) | 16(2) | 35(14) |
| 116 | 1.9 | 0.6 (foamed) | 4.2 | 1.0 | 0 | 53(49) | 46(44) | 69(63) |
| 117 | 6.2 | 5.9 | 13.6 | 10.3 | 0 | 0 | 0 | 0 |
| 118 | 6.3 | 4.8 | 12.4 | 8.6 | 0 | 0 | 0 | 0 |
| 119 | 6.3 | 2.4 | 10.5 | 7.0 | 0 | 1(1) | 0 | 0 |
| 120 | 0.8 | 0.2 | 4.3 | 1.2 | 64(4) | 98(86) | 42(18) | 100(100) |
| 121 | 4.4 | 1.0 | 6.3 | 1.9 | 0 | 15(1) | 4(1) | 36(3) |
| 122 | 4.2 | 0.7 (foamed) | 8.6 | 2.0 | 0 | 85(78) | 64(56) | 95(84) |
| 123 | 1.6 | 0.3 | 5.1 | 1.3 | 2(0) | 62(56) | 33(26) | 84(72) |
| 124 | 6.4 | 5.6 | 12.8 | 9.9 | 0 | 0 | 0 | 0 |
| 125 | 5.6 | 4.8 | 12.4 | 9.6 | 0 | 0 | 0 | 0 |
| 126 | 4.6 | 2.8 | 10.1 | 8.0 | 0 | 0 | 0 | 0 |
| 127 | 4.3 | 2.5 (partially foamed) | 8.2 | 4.1 | 0 | 3(3) | 1(1) | 3(3) |
| 128 | 4.2 | 1.2 (partially foamed) | 7.8 | 4.0 | 0 | 25(23) | 20(16) | 33(30) |
| 129 | 3.5 | 0.6 (foamed) | 6.0 | 2.2 | 0 | 93(72) | 43(39) | 96(88) |

TABLE 5

| No. | Composition (copolymerization ratio), ($\eta_{rel}$), blend ratio | Adhesive Constituent units (wt. %) hexamethylene sebacamide | 6-aminocaproic acid | Other amide recurring units | Physical properties Crystallinity (%) | Dynamic modulus ($\times 10^{10}$ dyne/cm$^2$) | Melting point (Tm °C.) | Crystal fusion heat variation (R) (%) |
|---|---|---|---|---|---|---|---|---|
| 123 | nylon 610 (3,3): nylon 6/66/612 (20/30/50) (2,5); nucleating agent added) 70:30 | 70 | 6 | 24 | 42 | 4.0 | 230 | 17 |
| 124 | nylon 610 (2,5) nylon 6/66/612 (20/30/50) (2,5); 70:30 | 70 | 6 | 24 | 25 | 1.7 | 221 | 7 |
| 125 | nylon 610 (2,5) nylon 6/66/612 (20/30/50) (2,5); 70:30 melt-mixed at 250° C. 0.5 hr | 70 | 6 | 24 | 24 | 1.7 | 216 | 7 |
| 126 | nylon 610 (2,5) nylon 6/66/612 (20/30/50) (2,5); 70:30 melt-mixed at 250° C. 3 hrs. | 70 | 6 | 24 | 20 | 1.4 | 212 | 5 |
| 127 | nylon 610 (2,5) nylon 6/66/612 (20/30/50) (2,5); 70:30 melt-mixed at 250° C. 10 hrs. | 70 | 6 | 24 | 16 | 1.1 | 210 | 5 |
| 128 | nylon 610 (2,5) nylon 6/66/612 (20/30/50) (2,5); 70:30 melt-mixed at 250° C. 16 hrs. | 70 | 6 | 24 | 13 | 0.9 | 208 | 2 |
| 129 | nylon 6/66/610 (6/9/15/70) (2,5) | 70 | 6 | 24 | 2 | 0.7 | 202 | 4 |

What is claimed is:

1. An easily openable closure adapted to be fixed to a can body by seaming and comprising a closure body of a rigid metallic material, a score formed therein reaching halfways in the thickness direction of the metallic closure body for defining a portion to be opened, and an opening tab provided near a score shearing starting point through a bonding support, said bonding support being comprised of a polyamide-type adhesive containing 6.1 to 15.0 main-chain carbon atoms on an average per amide group and having a crystallinity of 15 to 40% and a dynamic modulus, determined at a temperature of 25° C. and a relative humidity of not more than 20%, of $0.8 \times 10^{10}$ to $3.5 \times 10^{10}$ dynes/cm$^2$.

2. The closure of claim 1 wherein the polyamidetype adhesive contains 7.0 to 14.0 main-chain carbon atoms on an average per amide group, and a crystallinity of 20 to 35%.

3. The closure of claim 1 wherein the polyamidetype adhesive has a specific viscosity ($\eta_r$), determined at 20° C. in 98% sulfuric acid in a concentration of 1 g/100 cc, of 1.8 to 3.5.

4. The closure of claim 1 wherein the metallic material has an epoxy-type adhesive primer layer on its surface to be bonded.

5. The closure of claim 1 wherein the polyamidetype adhesive is composed of a polyamide composition comprising 55 to 97% by weight of hexamethylene sebacamide units, 1 to 35% by weight of 6-aminocaproic acid units and 0 to 35% by weight of other amide recurring units in the polymer chain as a whole, and having a melting point, determined by a differential acanning calorimeter as a peak value, of 210° to 227° C., and a crystal fusion heat variation, defined by the following equation $$R = (S_1 - S_0)/S_0 \times 100 \qquad (1)$$

wherein $S_0$ is the amount of heat of absorption by fusion determined on a melted and quenched product of the polyamide composition by a differential scanning calorimeter and $S_1$ is the amount of heat of absorption by fusion determined on the polyamide composition adhesive layer by a differential scanning colorimeter, of 0 to 15%.

6. The closure of claim 5 wherein the polyamide composition is a composition containing (A) polyhexamethylene sebacamide having a relative viscosity ($\eta_{rel}$), measured in a 1% solution of the polymer in 98% sulfuric acid, of 2.3 to 3.5 and (B) and at least one copolyamide containing at least 25% by weight of 6-aminocaproic acid units and having a relative viscosity of 2.3 to 3.5 in a A:B weight ratio of from 89:11 to 55:45.

7. A heat-resistant bonded structure comprising metallic materials bonded by a polyamide-type adhesive, said polyamide adhesive being composed of a polyamide composition, said composition comprising 55 to 97% by weight of hexamethylene sebacamide units, 1 to 35% by weight of 6-aminocaproic acid units and 0 to 35% by weight of other amide recurring units in the polymer chain as a whole, and having a melting point, determined by a differential scanning calorimeter as a peak value, of 210° to 227° C., and a crystal fusion heat variation, defined by the following equation $$R = (S_1 - S_0)S_0 \times 100 \qquad (1)$$

wherein $S_0$ is the amount of heat of absorption by fusion determined on a melted and quenched product of the polyamide composition by a differential scanning calorimeter and $S_1$ is the amount of heat of absorption by fusion determined on the polyamide composition adhesive layer by a differential scanning calorimeter, of 0 to 15%.

8. The bonded structure of claim 7 wherein the polyamide composition contains (A) polyhexamethylene sebacamide having a relative viscosity ($\eta_{rel}$), measured in a 1% solution of the polymer in 98% sulfuric acid, of 2.3 to 3.5 and (B) at least one copolyamide containing at least 25% by weight of 6-aminocaproic acid units and having a relative viscosity of 2.3 to 3.5 in an A:B weight ratio of from 89:11 to 55:45.

* * * * *